(12) United States Patent
Ekshinge et al.

(10) Patent No.: US 11,118,831 B2
(45) Date of Patent: Sep. 14, 2021

(54) VACUUM INSULATED STRUCTURE WITH INTERNAL AIRWAY SYSTEM

(71) Applicant: WHIRLPOOL CORPORATION, Benton Harbor, MI (US)

(72) Inventors: Sunil S. Ekshinge, Pune (IN); Arunkumar Harikrishnasamy, Stevensville, MI (US); Sai B. Krishna, Pune (IN); Abhay Naik, Stevensville, MI (US); Sanjesh Kumar Pathak, Stevensville, MI (US); Karen J. Querfurth, Coloma, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/874,742

(22) Filed: May 15, 2020

(65) Prior Publication Data

US 2020/0278149 A1 Sep. 3, 2020

Related U.S. Application Data

(63) Continuation of application No. 16/284,215, filed on Feb. 25, 2019, now Pat. No. 10,697,696.

(51) Int. Cl.
*F25D 23/00* (2006.01)
*F25D 23/06* (2006.01)
*B32B 3/00* (2006.01)

(52) U.S. Cl.
CPC ......... *F25D 23/063* (2013.01); *F25D 23/066* (2013.01); *B32B 3/00* (2013.01); *F25D 2201/14* (2013.01); *Y10T 428/231* (2015.01)

(58) Field of Classification Search
CPC ............. Y10T 428/231; F25D 2201/14; F25D 23/065; F25D 23/068; F25D 23/082;
(Continued)

(56) References Cited

U.S. PATENT DOCUMENTS 2,164,143 A * 6/1939 Munters ................ F25D 23/062
220/592.26
4,791,773 A 12/1988 Taylor
(Continued)

FOREIGN PATENT DOCUMENTS

EP 0757136 A1 2/1997
EP 1335171 A1 8/2003
(Continued)

*Primary Examiner* — Alexander S Thomas
(74) *Attorney, Agent, or Firm* — Price Heneveld LLP

(57) ABSTRACT

A vacuum insulated structure includes a first panel and a second panel, wherein the second panel is operably coupled to the first panel to define an insulating space therebetween. An airway system is disposed within the insulating space and includes portions of porous tubing configured to draw air along lengths of the porous tubing from the insulating space during an evacuation procedure. A plurality of connectors interconnect the portions of porous tubing of the airway system to inner walls of the insulating space. The connectors may include support members that extend between the panels within the insulating space to support the vacuum insulated structure under vacuum pressure. Further, first and second panels can include rigidifying structural configurations to combat vacuum bowing during the evacuation procedure.

17 Claims, 6 Drawing Sheets

(58) Field of Classification Search
CPC ...... F25D 23/085; F16L 59/065; E04B 1/803; Y02B 80/12; Y02B 80/14
See application file for complete search history.

(56) References Cited

U.S. PATENT DOCUMENTS

| | | | |
|---|---|---|---|
| 8,033,130 B2 * | 10/2011 | Cho | F25D 17/065 |
| | | | 62/275 |
| 8,857,931 B2 | 10/2014 | Jung et al. | |
| 9,207,010 B2 | 12/2015 | Jung et al. | |
| 9,228,775 B2 | 1/2016 | Jung et al. | |
| 9,377,227 B2 | 6/2016 | Jung et al. | |
| 9,528,749 B2 | 12/2016 | Jung et al. | |

FOREIGN PATENT DOCUMENTS

| | | |
|---|---|---|
| WO | 2018118080 A1 | 6/2018 |
| WO | 2018136054 A1 | 7/2018 |

* cited by examiner

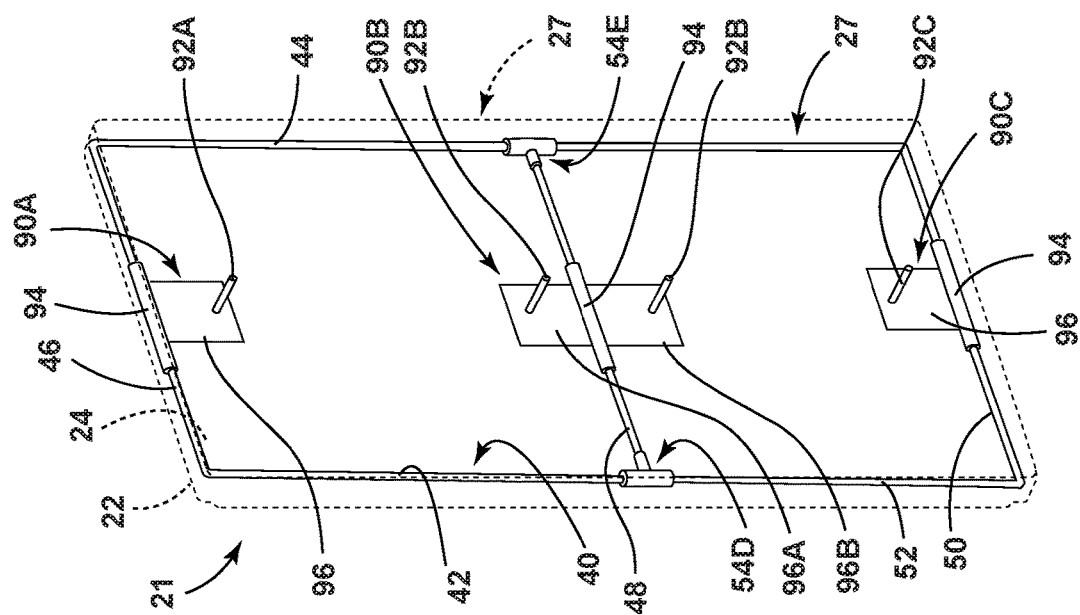
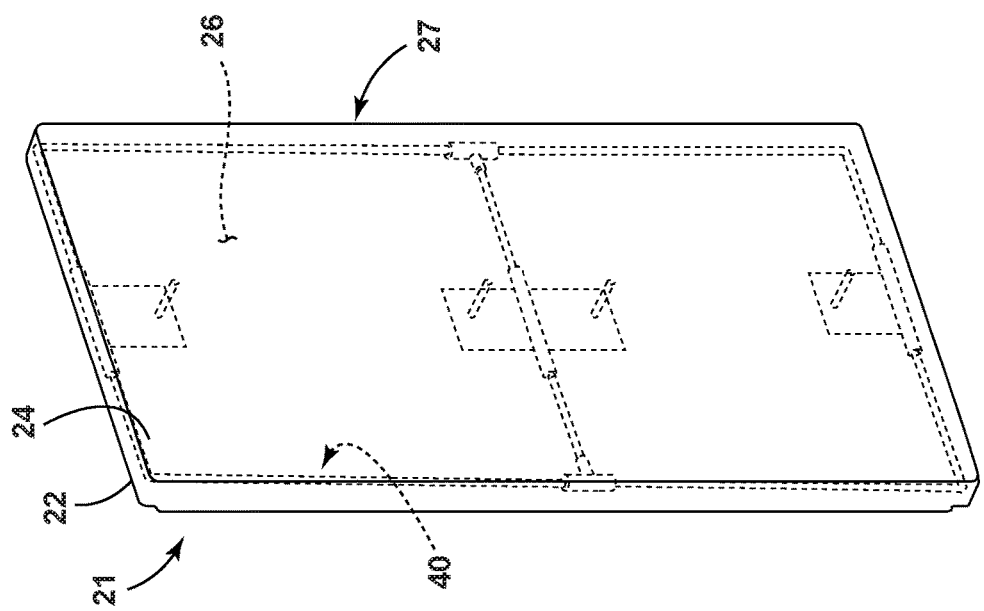
FIG. 3B
FIG. 3A

VACUUM INSULATED STRUCTURE WITH INTERNAL AIRWAY SYSTEM

CROSS-REFERENCE TO RELATED APPLICATIONS

This application is a continuation of U.S. patent application Ser. No. 16/284,215, now U.S. Pat. No. 10,697,696, filed on Feb. 25, 2019, entitled VACUUM INSULATED STRUCTURE WITH INTERNAL AIRWAY SYSTEM, the entire disclosure of which is hereby incorporated herein by reference.

BACKGROUND

The present device generally relates to a vacuum insulated structure, and more specifically, to a vacuum insulated structure having an internal airway system for improving evacuation time in drawing a vacuum on the structure.

SUMMARY

In at least one aspect, a vacuum insulated structure includes a first panel having inner and outer surfaces and a second panel having inner and outer surfaces. A trim breaker interconnects the first panel and the second panel to form an insulating space therebetween. An airway system is disposed within the insulating space and includes interconnected portions of porous tubing configured to draw air along lengths of the porous tubing from the insulating space during an evacuation procedure.

In at least another aspect, a vacuum insulated structure includes a first panel having inner and outer surfaces and a second panel having inner and outer surfaces. The second panel is operably coupled to the first panel to define an insulating space therebetween. An evacuation port is disposed on one of the first and second panels. An airway system is disposed within the insulating space and fluidically coupled to the evacuation port. The airway system includes interconnected portions of porous tubing configured to draw air along lengths of the porous tubing from the insulating space during an evacuation procedure.

In at least another aspect, a vacuum insulated structure includes a first panel and a second panel, wherein the second panel is operably coupled to the first panel to define an insulating space therebetween. An airway system is disposed within the insulating space and includes portions of porous tubing configured to draw air along lengths of the porous tubing from the insulating space during an evacuation procedure. A plurality of connectors interconnect the portions of porous tubing of the airway system to inner walls of the insulating space.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 3A is a top perspective view of a vacuum insulated structure for a door panel of the refrigerator shown in FIG. 1, wherein an airway system is shown in phantom within the structure;

FIG. 3B is a top perspective view of the vacuum insulated structure of FIG. 3A, wherein the panels of the vacuum insulated structure are shown in phantom to reveal the airway system;

DETAILED DESCRIPTION OF EMBODIMENTS

Figure 1:
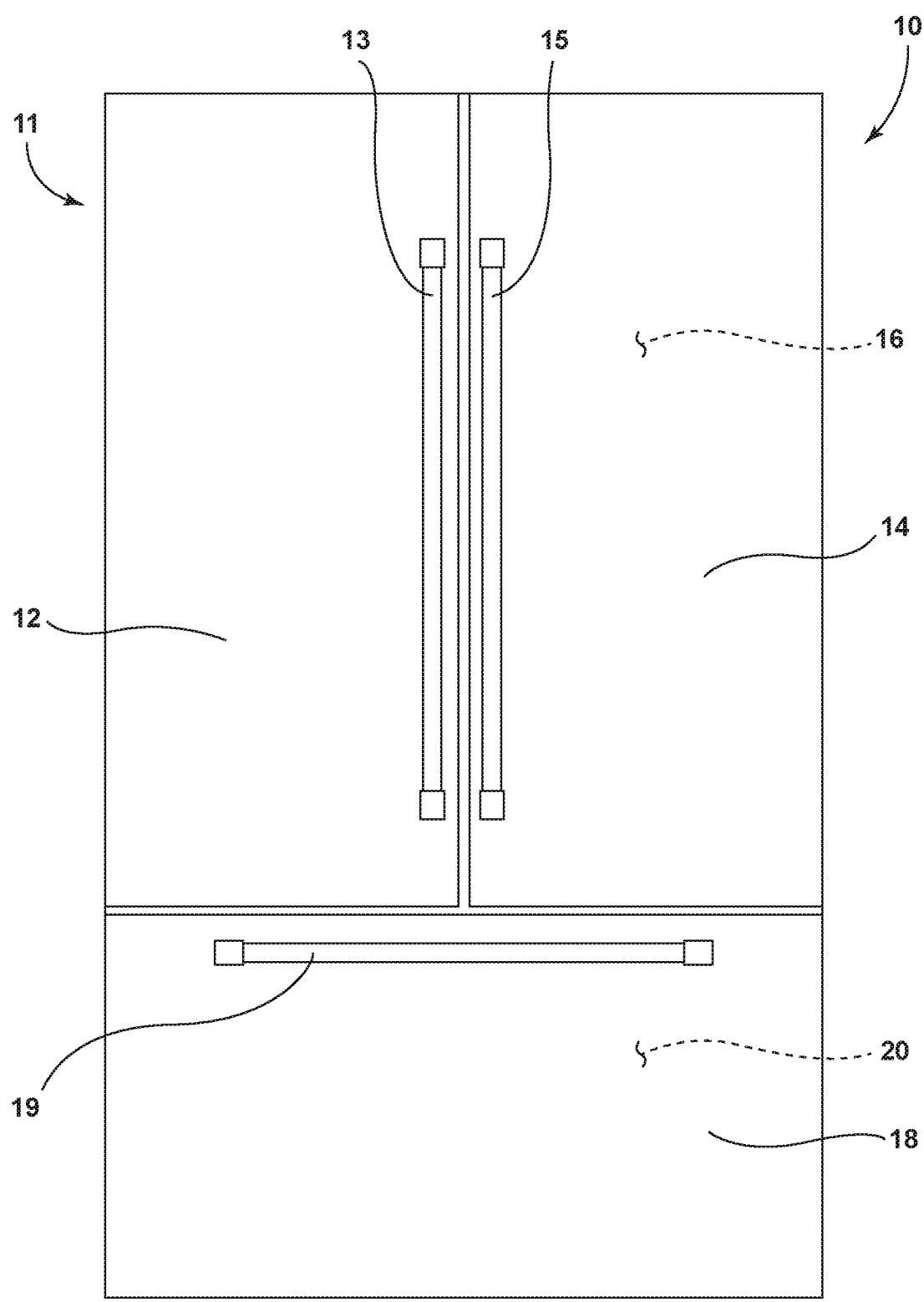
FIG. 1 is a front elevation view of an appliance for use with the present concept.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference numeral 10 generally designates an appliance shown in the form of a refrigerator that includes a vacuum insulated cabinet structure 11. The refrigerator 10 further includes first and second doors 12, 14 that are disposed in a French-style door configuration and are pivotally coupled to the vacuum insulated cabinet structure 11 for selectively providing access to a refrigerator compartment 16. The refrigerator 10 shown in FIG. 1 also includes a lower pull-out freezer drawer 18 having a handle 19 that selectively provides access to a freezer compartment 20. It will generally be understood that the features, as set forth herein, could be applied to any appliance having any general configuration. Further, the door configuration of the refrigerator 10 can vary from that shown in FIG. 1A to include a single door or multiple doors in other configurations. The first and second doors 12, 14 illustrated in FIG. 1 include handles 13, 15, respectively, which are configured to allow a user to selectively move the first and second doors 12, 14 between open and closed positions, either separately or together. The first and second doors 12, 14 and the freezer drawer 18 are also contemplated to be vacuum insulated structures, as further described below.

Figure 2B:
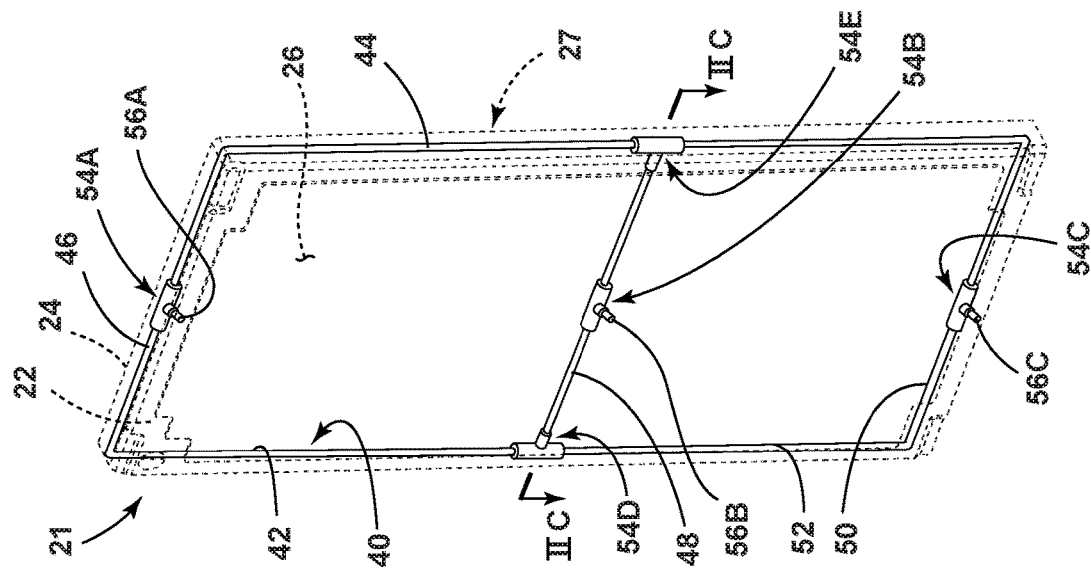
FIG. 2B is a top perspective view of the vacuum insulated structure of FIG. 2A, wherein the panels of the vacuum insulated structure are shown in phantom to reveal the airway system.
Figure 2A:
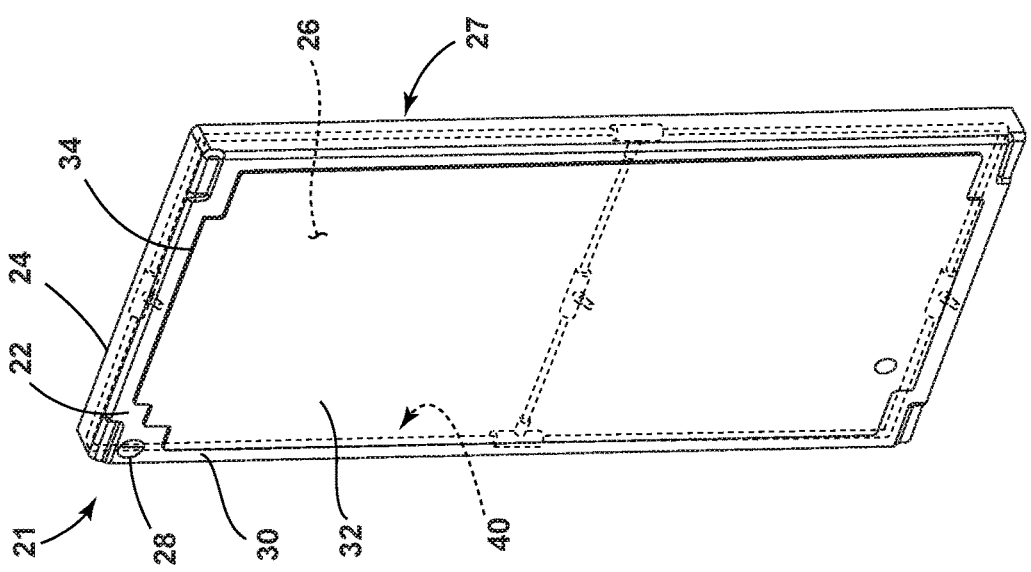
FIG. 2A is a top perspective view of a vacuum insulated structure for a door panel of the refrigerator shown in FIG. 1, wherein an airway system is shown in phantom within the structure.

Referring now to FIG. 2A, a vacuum insulated structure 21 is shown. The vacuum insulated structure is contemplated to be an insulating part of the first door 12 (FIG. 1) that supports an aesthetic outer skin on the first door 12. The vacuum insulated structure 21 is exemplary of a door panel for use with the present concept. As such, the description herein of the vacuum insulated structure 21 of the first door 12 will also generally describe a vacuum insulated structure of the second door 14 and the freezer drawer 18 shown in FIG. 1. While the vacuum insulated structure 21 is exemplified as a vacuum insulated structure for a door, the present concept can be used with any type of vacuum insulated structure, and therefore, is not limited to use with a door panel. As specifically shown in FIG. 2A, the vacuum insulated structure 21 includes first panel 22 coupled to a second panel 24. The first panel 22 and the second panel 24 may be interconnected by a trim breaker, such as trim breaker 60 shown in FIG. 2C. It is contemplated that the first panel 22 and the second panel 24 are comprised of a metal material, such as a sheet metal material. An interconnecting trim breaker may be comprised of a polymeric material. As coupled to one another, the first panel 22 and the second panel 24 cooperate to define an insulating space 26 disposed therebetween. As shown in FIG. 2A, the first panel 22 may include an access aperture 28 disposed therethrough and opening into the insulating space 26. In use, the access aperture 28 can be used to fill the insulating space 26 with an insulating material, such as an insulating powder, and may also be used with an evacuation port to draw a vacuum on the vacuum insulated structure 21, as further described below.

Figure 6:
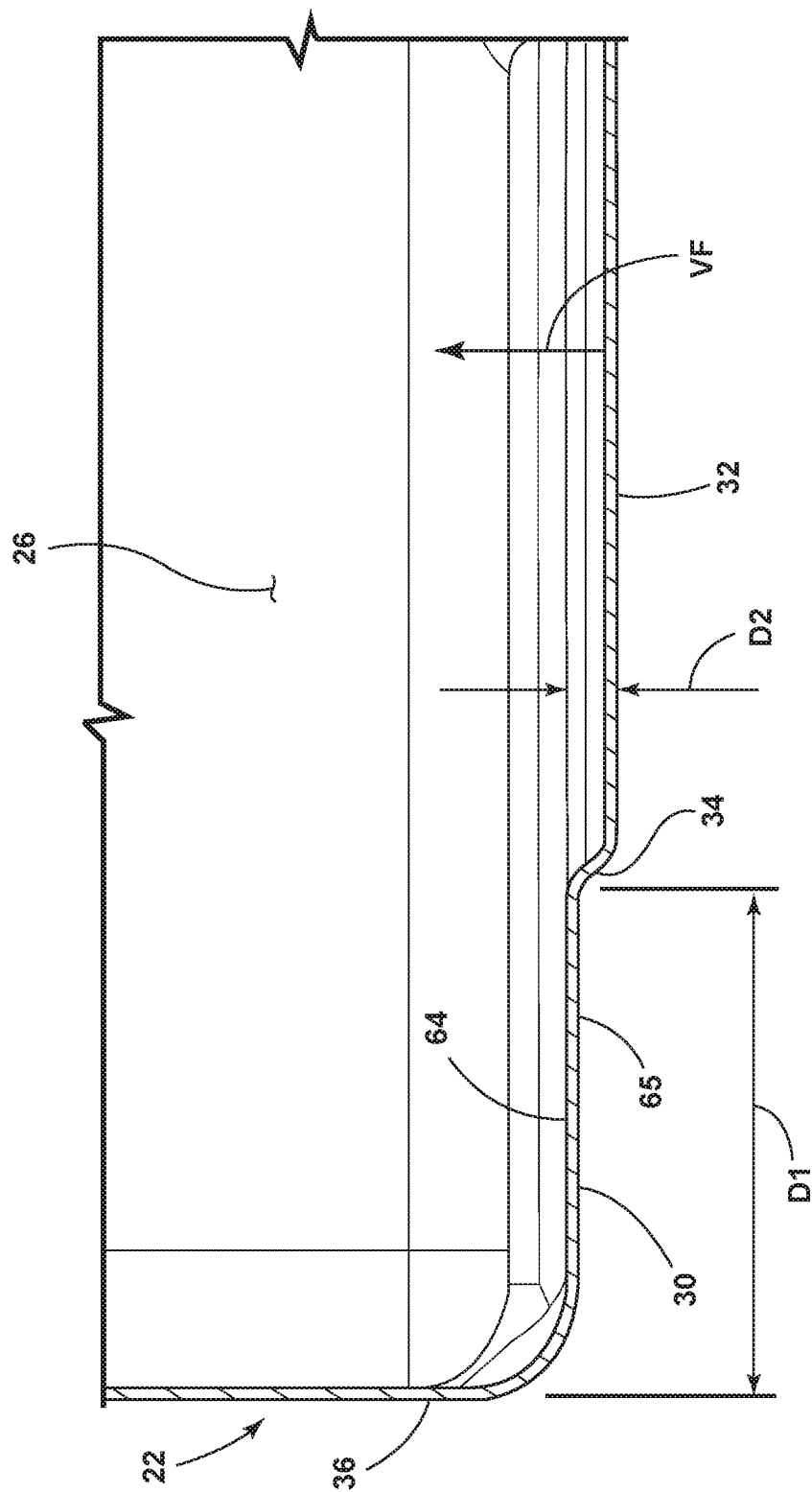
FIG. 6 is a fragmentary cross-sectional view of the panel of FIG. 5 taken at line VI.

As further shown in the embodiment of FIG. 2A, the first panel 22 includes a first body portion 30 which surrounds a second body portion 32. In the embodiment shown in FIG. 2A, the second body portion 32 is centrally disposed and outwardly extending from the first body portion 30. Thus, the second body portion 32 defines a raised portion of the first panel 22 relative to the first body portion 30. The second body portion 32 and the first body portion 30 are interconnected by an intermediate portion 34 which is best shown in FIG. 6. The intermediate portion 34 is an outwardly angled portion which outwardly extends the second body portion 32 relative to the first body portion 30 in a range from about 2 mm to 6 mm, or about 4 mm. With specific reference to FIG. 6, the distance spanned by the intermediate portion 34 between the first body portion 30 and the second body portion 32 is indicated by reference D2. With the second body portion 32 extending outwardly by a distance D2, the intermediate portion 34 of the first panel 22 defines an integrated stiffener for the first panel 22. Having an integrated stiffener in the first panel 22, the first panel 22 is provided with increased rigidity, as compared to a standard flat panel. This increased rigidity counters vacuum forces VF that act on the first panel 22 when a vacuum is drawn on the insulating space 26. As further shown in FIG. 6, the first body portion 30 extends from an outer edge 36 of the first panel 22 to the intermediate portion 34 a distance D1. The distance D1 shown in FIG. 6 is contemplated to be approximately in a range from about 20 mm to 30 mm, or about 25 mm. As shown in FIG. 6 the first panel 22 includes inner and outer surfaces 64, 65. With the rigidifying features integrated into the first panel 22, the outer surface 65 thereof will show little bowing during an evacuation procedure.

Figure 5:
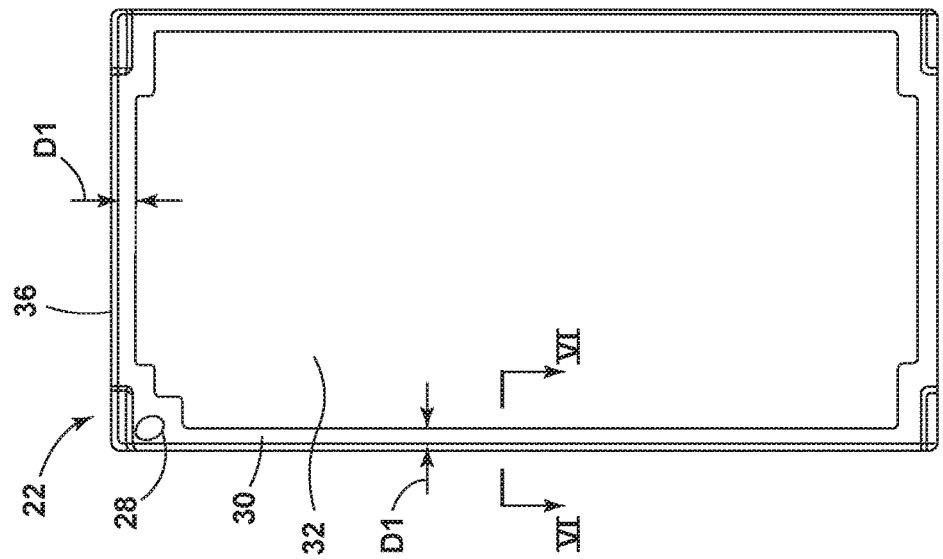
FIG. 5 is a front elevation view of the panel of FIG. 4.
Figure 4:
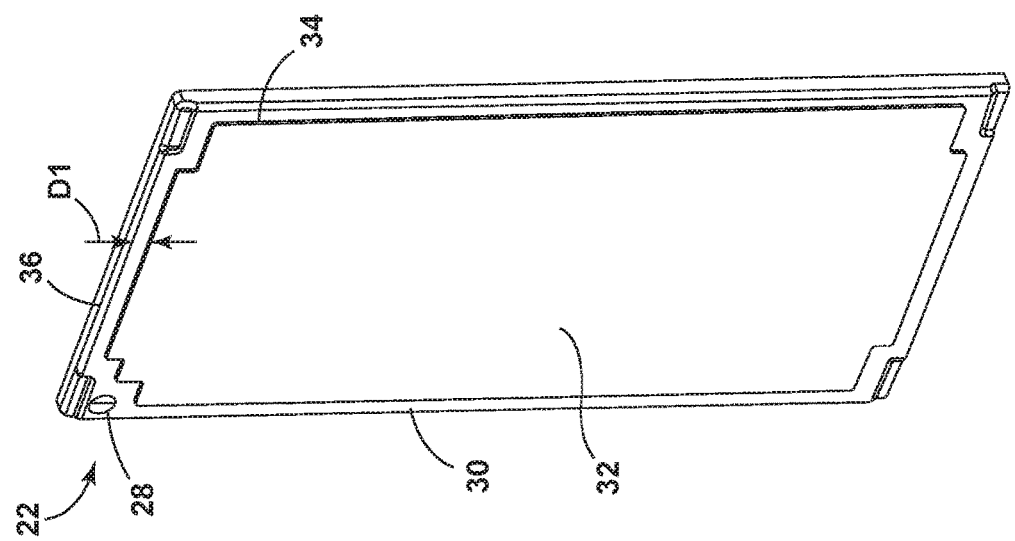
FIG. 4 is a top perspective view of a panel of the vacuum insulated structure shown in FIG. 2A.

With reference to FIGS. 4 and 5, the first panel 22 is shown as removed from the vacuum insulated structure 21 of FIGS. 2A and 2B. It is contemplated that the first panel 22 may define an inner portion or liner of the vacuum insulated structure 21 shown in FIGS. 2A and 2B. As such, the second panel 24 may define an outer portion or exterior wrapper of the vacuum insulated structure 21 shown in FIGS. 2A and 2B.

With a standard flat panels under vacuum pressure, vacuum induced bowing will generally occur around the outer edge of a panel, such as outer edge 36 of first panel 22 shown in FIG. 6, adjacent to an adhesion joint between the panels and a trim breaker. As such, an outer surface of a standard flat panel may bow inwardly about 6 mm or more from its pre-vacuum position. This bowing effect reduces the thermal insulation thickness within the insulating space, such as insulating space 26 shown in FIG. 6. Further, this bowing effect is unpredictable and affects the overall shape of the panel, thus making the overall aesthetic of the panel unsightly and further makes incorporation of the panel into a completed assembly complicated and unpredictable. By providing the integrated stiffener in the first panel 22 of the present concept at a distance D1 from the outer edge 36 of the first panel 22, vacuum bowing is reduced to approximately 1 mm or less. This reduced bowing helps to maintain a thermal insulation thickness requirement (20 mm or more) within the insulating space 26 and provides greater predictability of the overall shape and flatness of the vacuum insulated structure 21 (FIG. 2A) of which the first panel 22 is a part. While a raised central portion 32 is shown and described herein with regards to the first panel 22, it is contemplated that the second panel 24 can also include such an anti-bowing configuration.

With further reference to FIG. 2A, the vacuum insulated structure 21 includes an airway system 40 disposed within the insulating space 26. The airway system 40 is housed within the insulating space 26 between the first and second panels 22, 24 and is contemplated to be fluidically coupled to an access aperture of either one of the first and second panels 22, 24, such as access aperture 28 of the first panel 22. In assembly, the airway system 40 is contemplated to be coupled to an inner surface of the second panel 24 of the vacuum insulated structure 21. In this way, the airway system 40 is contemplated to couple to an inner surface of an exterior wrapper of a vacuum insulated structure, however, it is also contemplated that the airway system 40 may be suspended within the insulating space 26, and may also be coupled to the liner, or first panel 22 of the vacuum insulated structure 21.

Referring now to FIG. 2B, the first and second panels 22, 24 of the vacuum insulated structure 21 are shown in phantom to reveal the airway system 40 disposed within the insulating space 26. With the first and second panels 22, 24 shown in phantom, the specific features of the airway system 40 are revealed. In the embodiment shown in FIG. 2B, the airway system 40 includes first and second vertical portions 42, 44 which substantially run the vertical length of the first and second panels 22, 24. As further shown in FIG. 2B, the airway system 40 further includes first, second and third horizontal portions 46, 48 and 50 which interconnect the first and second vertical portions 42, 44, such that all of the portions 42, 44, 46, 48 and 50 are fluidically interconnected. The various portions 42, 44, 46, 48 and 50 of the airway system 40 are shown in FIG. 2B as being vertical and horizontal portions, however, it is contemplated that the various portions of the airway system 40 may be provided in any configuration within an insulating space of a vacuum insulated structure for improving the efficiency of drawing a vacuum on the vacuum insulated structure. Other such exemplary designs and configurations for the airway system 40 include serpentine structures and diagonal sections to provide further coverage within a vacuum insulated structure. The various portions of the airway system 40 shown in FIG. 2B are comprised of tubing 52 which is contemplated to be a porous or perforated tubing, such that air can be drawn from the insulating space 26 through the tubing 52 along an entire length of each interconnected portion 42, 44, 46, 48 and 50 of the tubing 52 during an evacuation procedure of the vacuum insulated structure 21. In FIG. 2B, the interconnected portions 42, 44, 46, 48 and 50 of porous tubing 52 are disposed around an outer perimeter 27 of the insulating space 26, such that the airway system 40 can reach to all corners of the insulating space 26.

As further shown in FIG. 2B, a plurality of connectors 54A-54E are used to interconnect portions of the tubing 52 of the airway system 40. In the embodiment shown in FIG. 2B, connectors 54A-54C include respective support members 56A-56C which outwardly extend from the connectors 54A-54C to interconnect inner surfaces of the second panel 24 and first panel 21, as further described below with reference to FIG. 2C. The support members 56A-56C define stiffeners between the first and second panels 22, 24 and act to internally support the vacuum insulated structure 21 to combat the effects of vacuum bow on the vacuum insulated structure 21 when a vacuum is drawn on the insulating space 26 thereof.

Figure 2C:
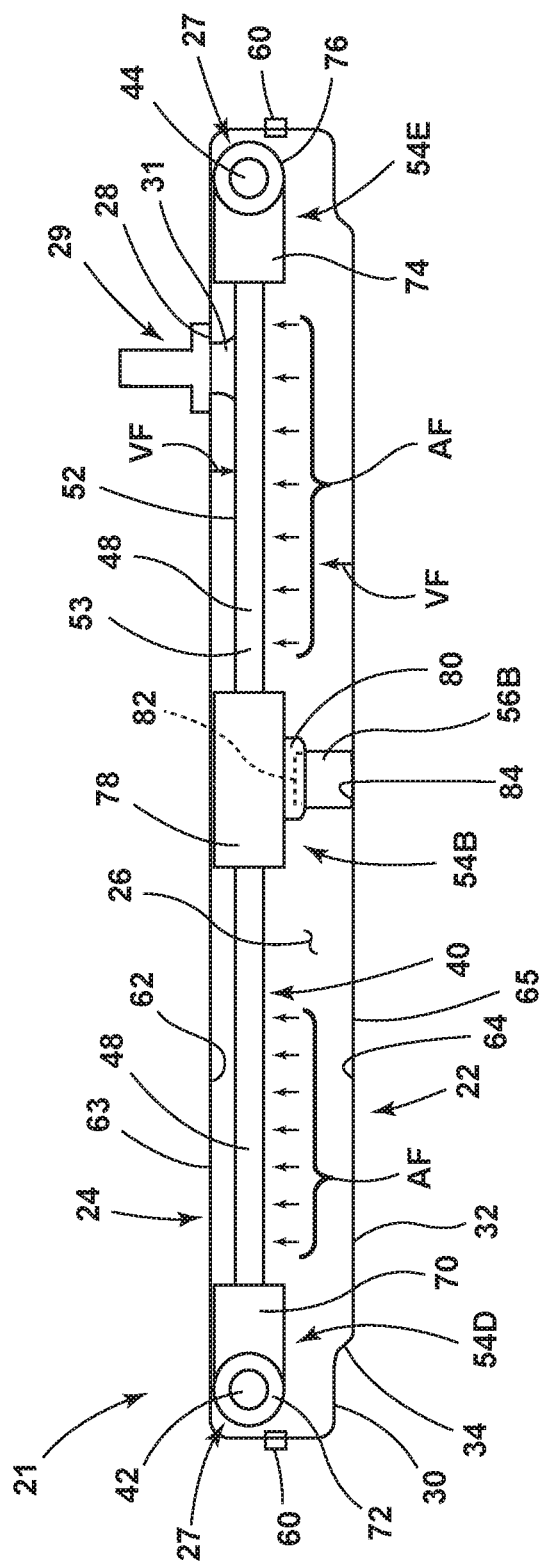
FIG. 2C is a cross-sectional view of the vacuum insulated structure of FIG. 2B taken at line IIC.

Referring now to FIG. 2C, the vacuum insulated structure 21 is shown from a cross-sectional view wherein the first panel 22 is coupled to the second panel 24 by interconnecting trim breaker 60. As coupled to the trim breaker 60, the first and second panels 22, 24 define the vacuum insulated structure 21 having the insulating space 26 disposed therebetween. As further shown in FIG. 2C, the airway system 40 is shown disposed within the insulating space 26 between the first and second panels 22, 24. The second panel 24 includes inner and outer surfaces 62, 63. Connectors 54D, 54B and 54E of the airway system 40 are shown in FIG. 2C as being coupled to the inner surface 62 of the second panel 24. As such, it is contemplated that the airway system 40 is coupled to an inner surface of a wrapper within a vacuum insulated structure to reinforce the stiffness of the vacuum insulated structure and help with increasing the efficiency of evacuating air from the vacuum insulated structure. With specific reference to connector 54D, a first portion 70 of the connector 54D is coupled to the second horizontal portion 48 of the airway system 40. A second portion 72 of the connector 54D is further coupled to the first vertical portion 42 of the airway system 40. Similarly, connector 54E includes a first portion 74 coupled to the second horizontal portion 48 of the airway system 40 on an opposite side of connector 54B relative to connector 54D. A second portion 76 of the connector 54D is further coupled to the second vertical portion 44 of the airway system 40. The horizontal portion 48 of the airway system 40 is interconnects connectors 54D, 54E with connector 54B. Connector 54B includes a first portion 78 which is connected to the second horizontal portion 48 of the airway system 40. The connectors 54B, 54D and 54E shown in FIG. 2C exemplify the various connectors shown in FIG. 2B which operate in a similar manner.

As noted above, the various portions of the airway system 40 comprise tubes 52 having body portions 53 that are porous or perforated to draw air into the tubes 52 in the airflow direction as indicated by arrows AF along the entire length of the portions of the tubes 52 that make up the various horizontal and vertical portions (42, 44, 46, 48, 50 (FIG. 2B)) of the airway system 40. The body portions 53 of the tubing 52 are contemplated to filter insulation material that may be disposed within the insulating space 26. As such, the body portions 53 are thought to be akin to a soaker hose having a porous material configuration. Having outwardly extending portions (42, 44, 46, 48, 50 (FIG. 2B)) covering an increased amount of area within the insulating space 26, the airway system 40 provides for better coverage as opposed to a single evacuation site for drawing air from the insulating space 26 of the vacuum insulated structure 21. In FIG. 2C, the second panel 24 includes an access aperture 28 that is coupled to an evacuation port 29. The airway system 40 includes a connector 31 that fluidically connects the airway system 40 to the evacuation port 29. The increased coverage provided by outwardly extending portions 42, 44, 46, 48 and 50 of the airway system 40 for drawing air from the insulating space 26 of the vacuum insulated structure 21 via the porous tubing 52 can reduce the overall evacuation time of the vacuum insulated structure 21. Evacuation time can be reduced from approximately 24 hours to reach an internal air pressure of lmbar using a single evacuation site, to approximately 1 hour by providing better airflow AF and coverage within the insulating space 26 through an insulating or core material disposed therein.

As further shown in FIG. 2C, connector 54B further includes a second portion 80 which is connected to a first end 82 of support member 56B. The support member 56B further includes a second end 84 which abuts the inner surface 64 of first panel 22. Thus, as shown in FIG. 2C, the support member 56B outwardly extends from the connector 54B across a width of the insulating space 26 to abut the inner surface 64 of the first panel 22, while the connector 54B, as noted above, is coupled to the inner surface 62 of the second panel 24. In this way, the configuration of the connector 54B and the support member 56B spans the width of the insulating space 26 of the vacuum insulated structure 21 to interconnect the inner walls (the inner surfaces 62, 64 of the second and first panels 24, 22) to provide rigidity between the first and second panels 22, 24 of the vacuum insulated structure 21 to counter bowing effects on the vacuum insulated structure 21 realized during evacuation of air from the vacuum insulated structure 21. Thus, as air flows in the direction as indicated by arrows AF into the various portions of the airway system 40 disposed within the insulating space 26 of the vacuum insulated structure 21, the interaction of the connector 54B and the outwardly extending support member 56B thereof will counteract the inwardly directed vacuum forces VF realized on the first and second panels 22, 24 of the vacuum insulated structure 21 during the evacuation of the vacuum insulated structure 21 via the airway system 40. The insulating space 26 defined between the first panel 22, the second panel 24 and the trim breaker 60 may have an air pressure level of less than about 1 atm, about 0.5 atm, about 0.4 atm, about 0.3 atm, about 0.2 atm, about 0.1 atm, about 0.01 atm, or less than about 0.001 atm (1 mbar) after a vacuum is drawn through the airway system 40 during an evacuation procedure. Such pressure provides the vacuum forces VF acting to draw the first and second panels 22, 24 inwardly. Thus, the present concept provides a vacuum insulated structure 21 having an integrated stiffener via the configuration of the first body portion 30 and the raised second body portion 32 of the first panel 22, as well as the plurality of support members, such as support member 56B shown in FIG. 2C, to counteract the vacuum forces VF as air is drawn from the insulating space 26 via the airway system 40.

Further, it is contemplated that the support members 56A-56C (FIG. 2B) are comprised of a material having a low thermal conductivity, such as a nonconductive polymeric material. In this way, as the support members 56A-56C contact the metal bodies of the first and second panels 22, 24, heat is not transferred from the exterior wrapper (or second panel 24) to the liner (or first panel 22) of the vacuum insulated structure 21 as incorporated into a refrigerator, such as refrigerator 10 is shown in FIG. 1. It is further contemplated that other support members and connector configurations, much like the support members 56A-56C shown in FIG. 2B, can be positioned at frequent intervals along the porous tubing 52 of the airway system 40 for providing better interconnection between the inner surfaces 62, 64 of the second and first panels 24, 22, respectively.

Referring now to FIG. 3A, the vacuum insulated structure 21 is again shown with the first panel 22 coupled to the second panel 24. As noted above, the first panel 22 and the second panel 24 may be interconnected by a trim breaker, such as trim breaker 60 shown in FIG. 2C. As further shown in FIG. 3A, the vacuum insulated structure 21 includes an airway system 40 disposed within the insulating space 26. The airway system 40 is housed within the insulating space 26 between the first and second panels 22, 24 and is contemplated to be fluidically coupled to an access aperture of either one of the first and second panels 22, 24, such as access aperture 28 of the first panel 22. In assembly, the airway system 40 is contemplated to be coupled to the inner surface 62 (FIG. 2C) of the second panel 24 of the vacuum insulated structure 21. In this way, the airway system 40 is contemplated to couple to an exterior wrapper of a vacuum insulated structure, however, it is also contemplated that the airway system 40 may be suspended within the insulating space 26, and may also be coupled to the liner, or first panel 22 of the vacuum insulated structure 21.

Referring now to FIG. 3B, the first and second panels 22, 24 of the vacuum insulated structure 21 are shown in phantom to reveal the airway system 40 disposed within the insulating space 26. With the first and second panels 22, 24 shown in phantom, the specific features of the airway system 40 are revealed. In the embodiment shown in FIG. 3B, the airway system 40, much like the airway system 40 shown in FIGS. 2A and 2B, includes first and second vertical portions 42, 44 and first, second and third horizontal portions 46, 48 and 50 which interconnect the first and second vertical portions 42, 44. As noted above, the various portions of the airway system 40 shown in FIG. 3B are comprised of tubing 52 which is contemplated to be a porous or perforated tubing, such that air can be drawn from the insulating space 26 through the tubing 52 during an evacuation procedure of the vacuum insulated structure 21.

As further shown in FIG. 3B, a plurality of connectors 54D, 54E and 92A-92C are used to interconnect portions of the tubing 52 of the airway system 40. In the embodiment shown in FIG. 2B, connectors 90A-90C include respective support members 92A-92C which outwardly extend from the connectors 90A-90C to interconnect inner surfaces 64, 62 of the first and second panels 22, 24, much like support members 56A-56C described above with reference to FIG. 2C. The support members 92A-92C define stiffeners between the first and second panels 22, 24 and act to internally support the vacuum insulated structure 21 to combat the effects of vacuum bow on the vacuum insulated structure 21 when a vacuum is drawn on the insulating space 26 thereof. Connectors 90A-90C include first portions 94 coupled to the tubing 52 of the airway system 40. The connectors 90A-90C further include second portions 96 which are configured to couple to the inner surface 62 of the second panel 24. In this way, the airway system 40 is contemplated to couple to an inner surface of an exterior wrapper of a vacuum insulated structure. The second portions 96 of connectors 90A-90C are shown in the form of plates that are used to couple the airway system 40 to the inner surface 62 of the second panel 24. As shown in FIG. 3B, connector 90B includes upper and lower plates 96A, 96B disposed on opposite sides of the first portion 94 of connector 90B. It is contemplated that any number of plates can be used to couple the airway system 40 to the inner surface 62 of the second panel 24. With either of the support members 56A-56C or 92A-92C in place within the insulating space 26 of the vacuum insulated structure 21, vacuum bowing can be significantly reduced or eliminated during an evacuation procedure. Without the support members 56A-56C or 92A-92C in place, the stiffened first panel 22 can reduce vacuum bowing to approximately 1 mm or less.

As noted above, connectors 54A-54E and 92A-92C are used to interconnect portions of porous tubing disposed within the insulating space 26 of a give vacuum insulated structure 21. The first portions 70 of connectors 54A-54E and the first portions 94 of connectors 92A-92C may be any type of interconnecting member used to interconnect the various portions of the one or more segments of porous tubing within the insulating space 26 of the vacuum insulated structure 21. The first portions 70, 94 may include clips, sheaths, clamps, friction-fit housings, fasteners or any other like member capable of interconnect sections of tubing.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A vacuum insulated structure, comprising:
   a first panel operably coupled to a second panel to form an insulating space therebetween;
   an evacuation port disposed on one of the first and second panels;
   an airway system disposed within the insulating space, wherein the airway system includes one or more portions of porous tubing configured to draw air along lengths of the one or more portions of porous tubing from the insulating space during an evacuation procedure; and
   a plurality of connectors interconnecting the one or more portions of porous tubing of the airway system with one of the first and second panels, wherein each connector of the plurality of connectors is coupled to an inner surface of the second panel.

2. The vacuum insulated structure of claim 1, wherein the airway system is fluidically coupled to the evacuation port.

3. The vacuum insulated structure of claim 1, wherein each connector of the plurality of connectors includes a support member outwardly extending therefrom.

4. The vacuum insulated structure of claim 3, wherein each support member extends across the insulating space and abuts an inner surface of the first panel.

5. The vacuum insulated structure of claim 4, wherein each support member is comprised of a polymeric material.

6. The vacuum insulated structure of claim 5, wherein the first and second panels are comprised of a sheet metal material.

7. The vacuum insulated structure of claim 1, including:
   a trim breaker comprised of a polymeric material, wherein the first and second panels are operably coupled to the trim breaker on opposite sides thereof.

8. The vacuum insulated structure of claim 1, wherein the first panel includes a first body portion extending around a second body portion, wherein the second body portion extends outwardly relative to the first body portion.

9. The vacuum insulated structure of claim 8, wherein the first body portion is interconnected to the second body portion by an outwardly angled intermediate portion.

10. The vacuum insulated structure of claim 9, wherein the second body portion extends outwardly from the first body portion a distance within a range of about 2 mm to about 6 mm.

11. The vacuum insulated structure of claim 1, wherein the first and second panels each includes a first body portion extending around a second body portion, wherein the second body portion extends outwardly relative to the first body portion along each of the first and second panels.

12. A vacuum insulated structure, comprising:
    a first panel having inner and outer surfaces;
    a second panel having inner and outer surfaces, wherein the second panel is operably coupled to the first panel to define an insulating space between the respective inner surfaces thereof;
    an evacuation port disposed on one of the first and second panels; and
    an airway system contained within the insulating space and fluidically coupled to the evacuation port, wherein the airway system includes two or more portions of tubing interconnected by a plurality of connectors, and further wherein each connector of the plurality of connectors includes a support member outwardly extending therefrom across the insulating space to interconnect the respective inner surfaces of the first and second panels.

13. The vacuum insulated structure of claim 12, wherein the two or more portions of interconnected tubing of the airway system surround an outer perimeter of the insulating space.

14. A vacuum insulated structure, comprising:
    a first panel operably coupled to a second panel to define an insulating space therebetween;
    an airway system disposed within the insulating space, wherein the airway system includes portions of porous tubing configured to draw air along lengths of the porous tubing from the insulating space during an evacuation procedure; and
    a plurality of connectors interconnecting the portions of porous tubing of the airway system to inner walls of the insulating space, wherein each connector of the plurality of connectors includes an outwardly extending support member operably interconnecting the first and second panels across the insulating space.

15. The vacuum insulated structure of claim 14, including:
    a trim breaker comprised of a polymeric material interconnecting the first and second panels.

16. The vacuum insulated structure of claim 15, wherein first and second panels are comprised of a metal material.

17. The vacuum insulated structure of claim 16, wherein each support member is comprised of a polymeric material.

* * * * *